US008873492B2

(12) United States Patent
Pyykkonen et al.

(10) Patent No.: US 8,873,492 B2
(45) Date of Patent: Oct. 28, 2014

(54) METHOD FOR SELECTING AN A-INTERFACE RESOURCE IN A MOBILE COMMUNICATION SYSTEM

(75) Inventors: Jarkko Reijo Tapani Pyykkonen, Muhos (FI); Antti Tapani Vainio, Tampere (FI); Janos Zeman, Veresegyhaz (HU)

(73) Assignee: Nokia Siemens Networks Oy, Espoo (FI)

( * ) Notice: Subject to any disclaimer, the term of this patent is extended or adjusted under 35 U.S.C. 154(b) by 201 days.

(21) Appl. No.: 13/574,263

(22) PCT Filed: Jan. 20, 2010

(86) PCT No.: PCT/EP2010/050640
§ 371 (c)(1), (2), (4) Date: Aug. 22, 2012

(87) PCT Pub. No.: WO2011/088892
PCT Pub. Date: Jul. 28, 2011

(65) Prior Publication Data
US 2012/0327902 A1 Dec. 27, 2012

(51) Int. Cl.
*H04W 4/00* (2009.01)
*H04W 88/18* (2009.01)
*H04W 92/14* (2009.01)

(52) U.S. Cl.
CPC ............ *H04W 88/181* (2013.01); *H04W 92/14* (2013.01)
USPC ............ 370/329; 370/331

(58) Field of Classification Search
CPC ............ H04W 88/181; H04W 92/14
USPC ............ 370/331, 329
See application file for complete search history.

(56) References Cited

U.S. PATENT DOCUMENTS

2010/0161325 A1* 6/2010 Hellwig et al. ............... 704/229
2011/0051682 A1* 3/2011 Kampmann et al. .......... 370/331

FOREIGN PATENT DOCUMENTS

WO 2009046594 A1 4/2009
WO 2009095070 A1 8/2009

OTHER PUBLICATIONS

3GPP TS 48.008 V9.4.0 (Sep. 2010), 3rd Generation Partnership Project; Technical Specification Group GSM/EDGE Radio Access Network; Mobile Switching Centre—Base Station System (MSC-BSS) interface; Layer 3 specification (Release 9), Sep. 2010, 209 pages.

F-06921 Sophia-Antipolis Cedex, "3rd Generation Partnership Project; Technical Specification Group GERAN; A-interface over IP Study (AINTIP); (Release 9)" 3GPP Standard; 3GPP TR 43.903, 3RD Generation Partnership Project (3GPP), Mobile Competence Centre; 650, Route des Lucioles; France, No. V9.0.0, Dec. 9, 2009, pp. 1-62, XP050400558.

* cited by examiner

*Primary Examiner* — Sai-Ming Chan
(74) *Attorney, Agent, or Firm* — Laurence A. Greenberg; Werner H. Stemer; Ralph E. Locher

(57) ABSTRACT

A preferred A-interface resource on a first connection leg is determined by a mobile switching center server based on information on capabilities of a base station subsystem and on characteristics of second connection leg of a connection. A request message is transmitted to the base station subsystem, which requests a connection according to the preferred A-interface resource. The request message is processed by the base station subsystem and an A-interface resource is selected for the user plane connection.

46 Claims, 3 Drawing Sheets

BSS 10
MSS 21
201 BSS capabilities information
202 Determine preferred A-interface transport type
203 Assignment request / Handover request
204 Decide A-interface transport type
205 Assignment complete / Handover complete
206 perform user plane connection according to decided A-interface transport type

METHOD FOR SELECTING AN A-INTERFACE RESOURCE IN A MOBILE COMMUNICATION SYSTEM

FIELD AND BACKGROUND OF THE INVENTION

The present invention relates to mobile communication network systems and their transmission technology migration. In particular, the invention relates to migration to IP (Internet Protocol) technology of the A-interface.

In mobile communication networks, e.g. networks according to 3GPP (Third Generation Partnership Project) Release 4 architecture, a core network, e.g. an MSC (Mobile Switching Centre) server system, is used to connect different access networks, e.g. BSS (Base Station Subsystem) to each other. In Release 4 networks, MSC functionality is split into two logical functions, which typically are provided by physically separate network elements, namely a Media Gateway (MGW) and an MSC server (MSS). Control functions of the MSC are provided by the MSS. Bearer switching functions of the MSC are provided by the MGW.

In mobile communication networks, many domains and interfaces between these domains have been adapted to IP technology. Today's general trend is to use IP transmission as widely as possible. BSS over IP is a technique trend in wireless network evolution, which can construct high bandwidth, high efficiency and low cost basic networks. BSS over IP involves Gb-interface and A-interface over IP. Gb-interface over IP has been standardised in 3GPP Release 4, and for A-interface over IP, control plane signalling over IP (SIGTRAN) has been introduced in 3GPP Release 8.

Traditionally, the user plane of the A-interface is based on TDM (Time Division Multiplexing) transmission technology. In order to take full advantage of IP based technologies, protocols of A-interface user plane should be adapted for IP based transport. One of the main advantages of having IP based A-interface also for the user plane is a much more flexible network design between the BSS and the CS (Circuit Switched) core network. The A-interface over IP (AoIP) can also simplify implementation of Multipoint A feature in a pooled network. Furthermore, UTRAN (UMTS (Universal Mobile Telecommunications System) Terrestrial Radio Access Network) and more advanced RAN (Radio Access Network) can use a common IP backhaul with GERAN (GSM (Global System for Mobile communication) Edge (Enhanced Data rates for Global Evolution) Radio Access Network).

Based on 3GPP AoIP work item, a GSM (Global System for Mobile communication) BSS communicates with the core network over the A-interface (A reference point) which is an Mb like interface (IP interface, "Mb access (GSM)").

In Release 8, 3GPP has standardized the user plane of A-interface over IP (AoIP) as an alternative for legacy A-interface over TDM (AoTDM). The standard supports two options:

AoIP with TC transcoding (TC) in BSS

AoIP with TC in MGW

The second option "AoIP with TC in MGW" seems to be an option which will be most widely implemented. Main reasons for this are the benefits that "AoIP with TC in MGW" provides: No separate TC elements are needed in the BSS network. Common transcoding resources located in the core network/MGW can be used for 2G (second generation mobile communications network), 3G (third generation mobile communications network), and SIP/IMS (Session Initiation Protocol/Internet Multimedia Subsystem) traffic. IP bandwidth savings can be reached by transmitting compressed mobile codec in the AoIP interface instead of G.711 Pulse Code Modulation (PCM) speech codec. MGW call handling capacity savings and optimal speech quality are achieved by 2G TrFO (Transcoder Free Operation). Cost savings are reached due to the reduced number of network elements because no separate TC is needed in BSS network for AoIP calls. Network implementation and maintenance is easier because of the reduced number of network elements and amount of TDM transport.

However, there is a large amount of existing GSM networks with TDM based A-interface. When AoIP with TC in MGW feature is introduced in a network, there are no means to utilize the existing 2G transcoders, such as Transcoder and Rate Adaptation Unit (TRAU), and TDM lines in a practical way without affecting on speech quality or causing extra load (Digital Signal Processing) in MGW.

SUMMARY OF THE INVENTION

The invention aims at providing a smooth migration between A-interface transmission technologies in a mobile communication system. A migration scenario is provided where a BSS supports simultaneously both AoIP and AoTDM interfaces. Further, the invention aims at providing a solution exploiting the existing transcoding and transmission resources in a practical and controlled way also in the networks where AoIP with TC in MGW feature is used. The migration scenario presented in the embodiments utilizes existing BSS and MSS/MGW (Media Gateway) functionality as effectively as possible.

This is achieved by the apparatuses and methods as defined in the appended claims. The invention may also be implemented as a computer program product.

The present invention overcomes the above described problem by providing an apparatus and a method comprising determining a preferred A-interface resource on a first connection leg based on information on capabilities of base station subsystem and on characteristics of second connection leg of a connection.

According to further refinements of the invention as defined under the above aspect: The preferred A-interface resource comprises one of a first A-interface transport type and a second A-interface transport type or a speech codec, wherein the first A-interface transport type is A-interface over Time Division Multiplexing and the second A-interface transport type is A-interface over Internet protocol, e.g. A-interface over Internet Protocol with transcoding in media gateway. Further, the capabilities of a base station subsystem comprise support for the first A-interface transport type and support for the second A-interface transport type. The second connection leg characteristics comprise at least one of transport type and codec.

One aspect of the invention comprises determining the first A-interface transport type as the preferred A-interface transport type in case said second connection leg transport type is Time Division Multiplexing. Another aspect of the invention comprises determining the first A-interface transport type as the preferred A-interface transport type in case said second connection leg codec is Pulse Code Modulation. In that way e.g. Public Switched Telephone Network (PSTN) terminated calls the 2G transcoding resources (TRAU) and TDM transmission can be utilized in practical way and MGW transcoding capacity is saved.

Yet another aspect of the invention comprises determining the second A-interface transport type as the preferred A-interface transport type in case said second connection leg codec is a compressed codec and said second connection leg transport type is one of Asynchronous Transfer Mode and Internet Protocol. In that way e.g. in 3G terminated calls the TrFO and all other AoIP with TC in MGW benefits can be achieved.

Further refinements of the invention include: Transmitting a message to the base station subsystem, which requests a connection according to the preferred A-interface resource, wherein the message is preferably transmitted via a control plane signalling over Internet Protocol, e.g. via Base Station System Application Part signaling, wherein the message can comprise at least one of an assignment request message and a handover request message. Receiving a response message indicating the selected A-interface resource. Receiving information on capabilities of a base station subsystem. Storing information on capabilities of a base station subsystem, and retrieving the information from the memory.

According to an aspect of the invention, the preferred A-interface resource is to be used on an interface between a mobile switching centre server and the base station subsystem.

Enhanced GSM architecture with flexible IP transmission enables to continue GSM networks and services in an optimised way. In particular, more capacity (simultaneous calls) can be achieved by optimal routing, congestions can be reduced and enhanced features such as TrFO can be used which results in better quality and customer satisfaction, network maintenance is facilitated and less network elements may be needed.

For the purpose of the present invention to be described herein below, it should be noted that

- a device can act as a client entity or as a server entity in terms of the present invention, or may even have both functionalities integrated therein;
- method steps likely to be implemented as software code portions and being run using a processor at one of the server/client entities are software code independent and can be specified using any known or future developed programming language;
- method steps and/or devices likely to be implemented as hardware components at one of the server/client entities are hardware independent and can be implemented using any known or future developed hardware technology or any hybrids of these, such as MOS, CMOS, BiCMOS, ECL, TTL, etc, using for example ASIC components or DSP components, as an example;
- generally, any method step is suitable to be implemented as software or by hardware without changing the idea of the present invention;
- devices can be implemented as individual devices, but this does not exclude that they are implemented in a distributed fashion throughout the system, as long as the functionality of the device is preserved.

DESCRIPTION OF THE INVENTION

In the following the invention will be described by way of embodiments thereof with reference to the accompanying drawings.

Figure 1:
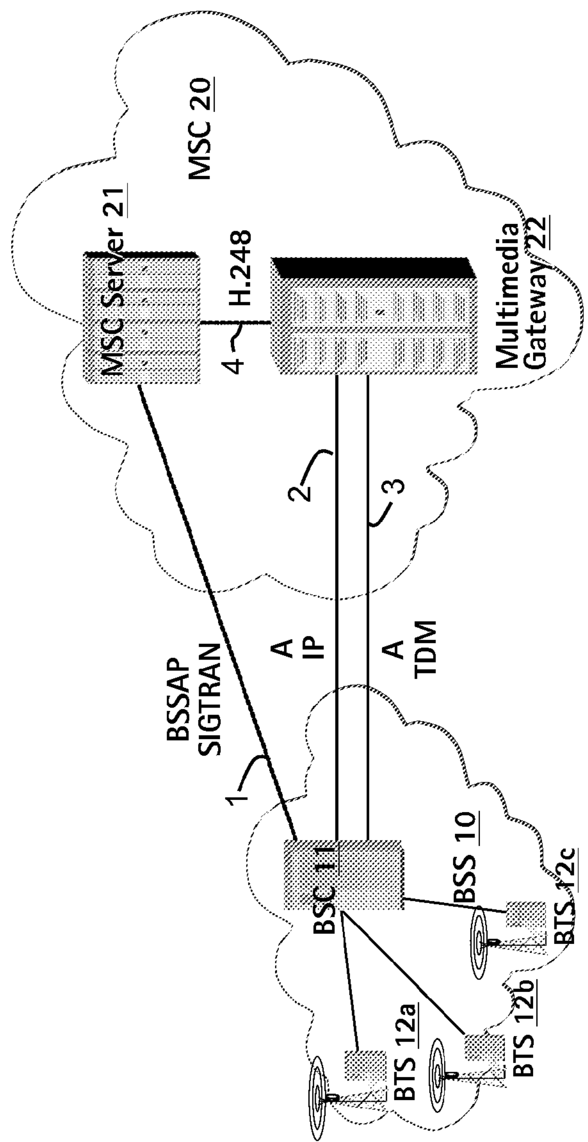
FIG. 1 shows a schematic diagram illustrating an AoIP migration example in a mobile communication system according to an embodiment of the invention.

FIG. 1 shows a schematic diagram illustrating an AoIP migration example in a mobile communication system according to an embodiment of the invention. The mobile communication system comprises a BSS 10 and an MSC 20. The BSS 10 comprises a BSC (Base Station Controller) 11 and a plurality of BTSs (Base Transceiver Stations) 12*a*, 12*b*, 12*c*. The MSC 20 comprises an MSC server (MSS) 21 and a multimedia gateway (MGW) 22. Control plane signalling between the MSC 20 (MSC server 21) and the BSS 10 (BSC 11) is performed via a BSSAP over SIGTRAN (Signalling Transport) interface 1, and user plane transmission between the MSC 20 (multimedia gateway 22) and the BSS 10 (BSC 11) can be performed over an IP based A-interface 2 or over a TDM based A-interface 3. Communication between the MSC server 21 and the multimedia gateway 22 is performed over an H.248 interface 4.

The BSS 10 comprises separate internal hardware for AoIP and AoTDM interfaces 2, 3. Transcoding functionality when AoTDM is in use is located in the BSS 10, and A-interface circuits and circuit pools (not shown) for AoTDM are supported at the BSS 10 and MSS 20.

The MSS 20 is provided with information which A-interface transport types the BSS 10 supports. For example, the BSS support for AoIP interfaces and/or AoTDM interface can be signalled via BSSAP. Alternatively, the MSS 20 may be preconfigured with the information. This information may be stored in a memory (not shown) in the MSS 20.

Figure 2:
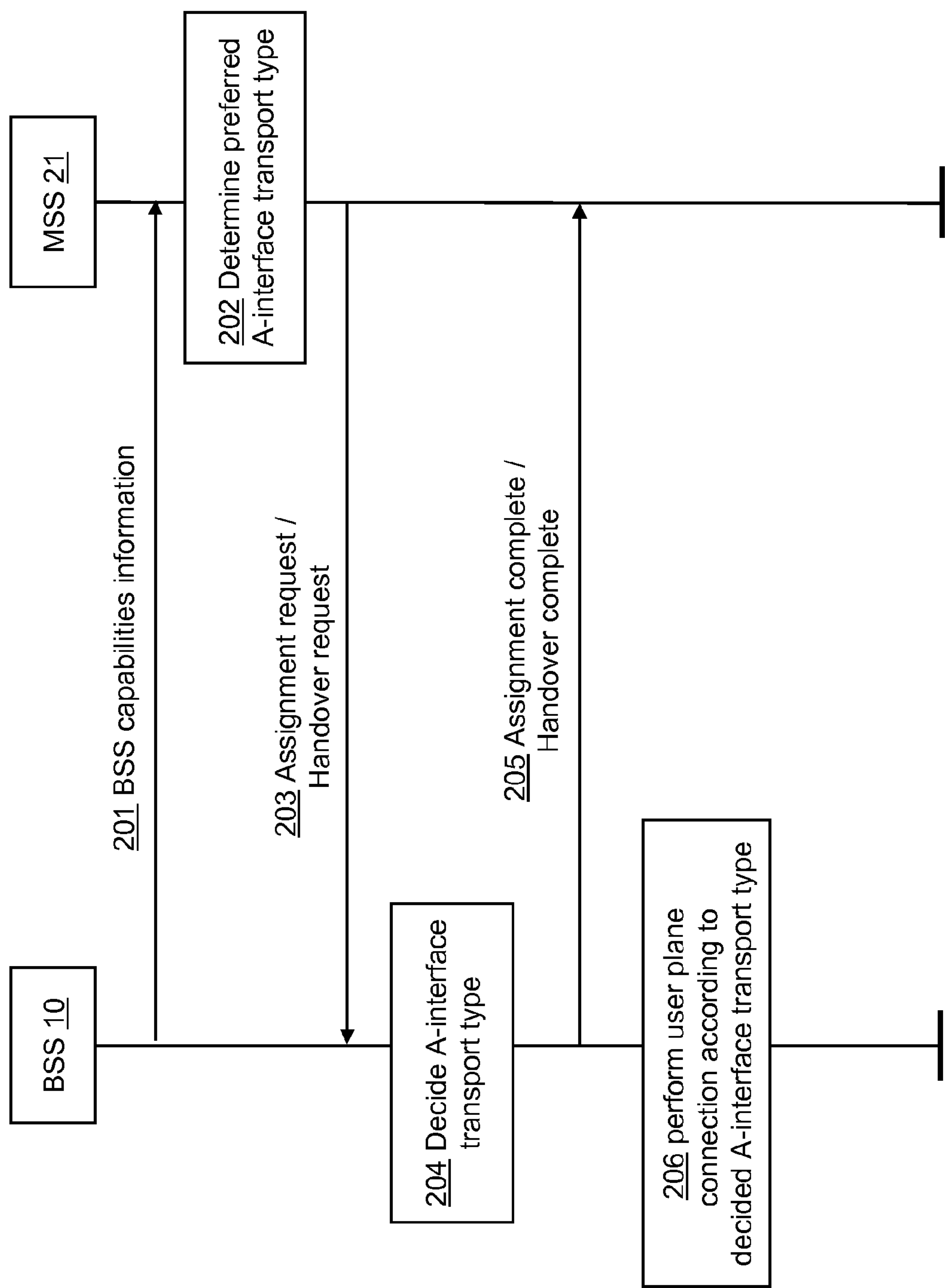
FIG. 2 shows a signalling diagram illustrating signalling between a BSS and an MSS according to an embodiment of the invention.

FIG. 2 shows a signalling diagram illustrating signalling between the BSS 10 and the MSS 20 according to an embodiment of the invention.

In step 201 the MSS 20 is provided with BSS capabilities information on whether the BSS 10 supports AoIP with TC in MGW, AoIP with TC in BSS and/or AoTDM. BSS can support one or more of the mentioned interfaces. This information may be sent from the BSS 10 to the MSS 20 via BSSAP over SIGTRAN interface 1 using a BSSAP parameter. The used BSSAP message can be a COMPLETE LAYER 3 INFORMATION message including the "Codec List (BSS supported)" information element according to 3GPP TS 48.008 standard specification. FI, PT and/or PI flags of this IE can be used to indicate the supported A-interface transport types. Alternatively, the information may be preconfigured in the MSS 20 as described above.

In step 202, the MSS 20 determines a preferred A-interface resource, for example A-interface transport type or used codec, based on the BSS capabilities information and on the characteristics of the terminating (or originating, depending on the call establishment direction) side of the call. These characteristics can include for example a transport type, such as ATM, IP or TDM, and a used codec, such as PCM or a compressed codec. BSS capabilities information can include for example information on BSS supported A-interface transport types, such as AoIP with TC in MGW, AoIP with TC in BSS and AoTDM.

If the BSS supports AoIP with TC in MGW and AoTDM, and if the terminating (or originating, depending on the call establishment direction) side transport type is TDM or if the selected codec is PCM, the MSS shall select AoTDM as a preferred A-interface type towards 2G radio network.

If the BSS supports AoIP with TC in MGW and AoTDM, and if the terminating (or originating, depending on the call establishment direction) side transport type is IP/ATM and selected codec is compressed codec, the MSS shall select the "AoIP, TC in MGW" as a preferred A-interface type towards 2G radio network.

If the BSS supports all AoIP with TC in MGW, AoIP with TC in BSS and AoTDM, and if terminating (or originating, depending on the call establishment direction) side transport type is TDM or if the selected codec is PCM, the MSS can select one of AoTDM or AoIP with TC in BSS as a preferred A-interface type towards 2G radio network.

In step 203 the MSS 20 transmits a message to the BSS 10 which requests a user plane connection according to the preferred A-interface transport type. The used BSSAP message can be an ASSIGNMENT REQUEST message or a HANDOVER REQUEST message including the "Codec list (MSC preferred)" information element according to 3GPP TS 48.008 standard specification. FI, PT and/or PI flags of this IE can be used to indicate the preferred A-interface transport types. This message may be sent in assignment request and handover messages via BSSAP over SIGTRAN interface 1.

In a step 204 the BSS 10 processes the message and makes the final selection of A-interface transport type. Whenever possible it should follow the MSS preferred option.

In step 205 the BSS 10 transmits a message to the MSS 20, indicating the selected A-interface transport type. The BSSAP message used can be an ASSIGNMENT COMPLETE or a HANDOVER COMPLETE message including the "Speech codec (chosen)" information element according to 3GPP TS 48.

In step 206, a user plane connection is performed over the selected A-interface transport type, for example according to standardized procedures in 3GPP TS 48.008 specification.

Figure 3:
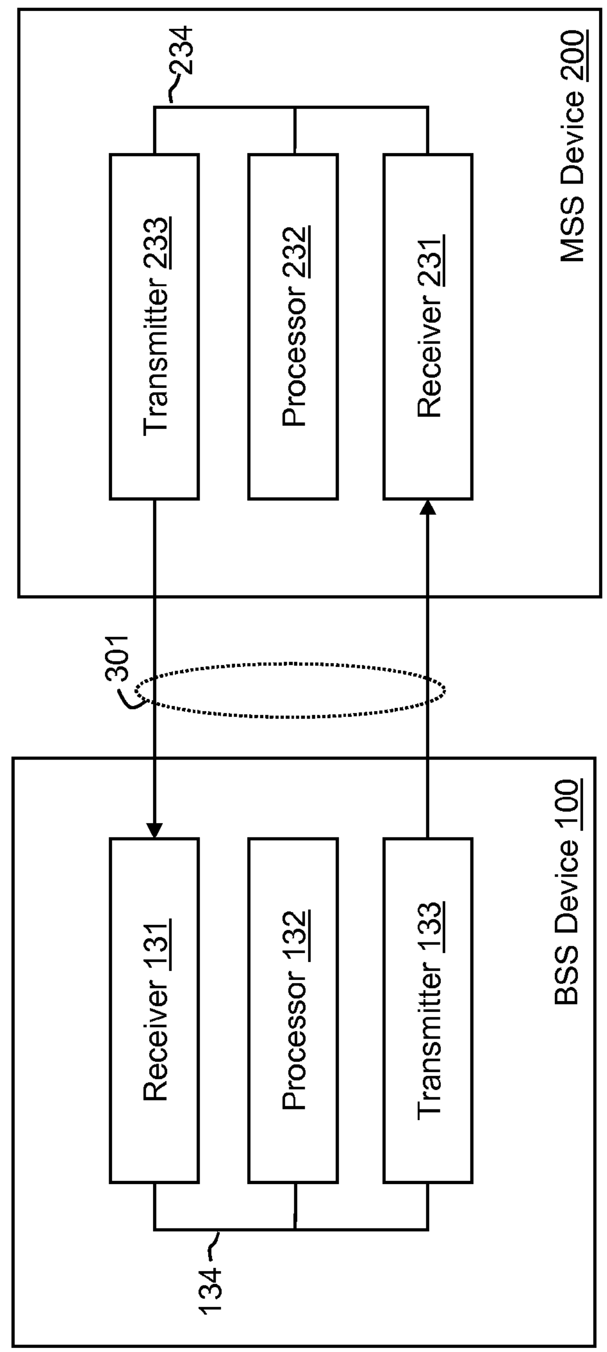
FIG. 3 shows a schematic block diagram illustrating a structure of a BSS device and an MSS device according to an embodiment of the invention.

FIG. 3 shows a schematic block diagram illustrating a structure of a BSS device 100 and an MSS device 200 according to an embodiment of the invention.

The BSS 10 shown in FIG. 1 comprises the BSS device 100, and the MSS 21 shown in FIG. 1 comprises the MSS device 200.

The BSS device 100 comprises a receiver 131, a processor 132 and a transmitter 133 which are connected via an internal bus 134. The MSS device 200 comprises a receiver 231, a processor 232 and a transmitter 233 which are connected via an internal bus 234. The BSS device 100 and the MSS device 200 communicate with each other via an interface 301, e.g. the BSSAP over SIGTRAN interface 1 (FIG. 1). The processor 132 and the processor 232 each may comprise an internal memory (not shown) into which an application program can be loaded and which may function as a working area when the program is executed.

The processor 232 of the MSS device 200 determines a preferred user plane A-interface transport type based on information on capabilities of the BSS device 100 and on characteristics of the terminating (or originating, depending on the call establishment direction) side of the call. These characteristics can include for example a transport type, such as ATM, IP or TDM, and a used codec, such as PCM or a compressed codec. BSS capabilities information can include for example information on BSS supported A-interface transport types, such as AoIP with TC in MGW, AoIP with TC in BSS and AoTDM. The processor further causes the transmitter 233 to transmit a message to the BSS device 100 which requests a connection according to the determined preferred A-interface transport type, e.g. AoIP with TC in MGW or AoTDM.

The receiver 231 may receive the information on the capabilities of the BSS device 100, which may have been prepared by the processor 132 of the BSS device 100, from the transmitter 133 of the BSS device 100. Alternatively or in addition, the MSS device 200 or the MSS 21 may comprise a memory (not shown) storing configurable information about BSS capabilities, and the processor 232 may retrieve the information on the capabilities of the BSS device 100 from the memory.

The receiver 131 of the BSS device 100 receives the message which requests the connection according to the determined preferred A-interface transport type. The processor 132 of the BSS device 100 processes the message, and decides the A-interface transport type, e.g. AoIP with TC in MGW, AoIP with TC in BSS or AoTDM, for the connection, and causes the transmitter 133 to transmit a response message to the MSS device 200.

According to an embodiment of the invention, a preferred A-interface transport type is determined by a mobile switching centre server based on information on capabilities of a base station subsystem and on characteristics of the terminating (or originating, depending on the call establishment direction) side of the call. These characteristics can include for example a transport type, such as ATM, IP or TDM, and a used codec, such as PCM or a compressed codec. BSS capabilities information can include for example information on BSS supported A-interface transport types, such as AoIP with TC in MGW, AoIP with TC in BSS and AoTDM. A request message is transmitted to the base station subsystem, which requests a connection according to the determined preferred A-interface transport type. The request message is processed by the base station subsystem and the A-interface transport type for the connection is decided.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A communication apparatus, comprising:

a processor of a mobile switching center configured to determine a preferred A-interface resource on a first connection leg based on information on capabilities of a base station subsystem and on characteristics of a second connection leg of a connection.

2. The apparatus according to claim 1, wherein said preferred A-interface resource comprises one of a first A-interface transport type and a second A-interface transport type.

3. The apparatus according to claim 1, wherein said preferred A-interface resource comprises a speech codec.

4. The apparatus according to claim 1, wherein said capabilities of a base station subsystem comprise support for a first A-interface transport type and support for a second A-interface transport type.

5. The apparatus according to claim 1, wherein said first A-interface transport type is A-interface over Time Division Multiplexing and said second A-interface transport type is A-interface over Internet protocol.

6. The apparatus according to claim 5, wherein said A-interface over Internet protocol is A-interface over Internet Protocol with transcoding in media gateway.

7. The apparatus according to claim 1, wherein said characteristics are a second connection leg transport type.

8. The apparatus according to claim 1, wherein said characteristics are a second connection leg codec.

9. The apparatus according to claim 1, wherein said processor is configured to determine said first A-interface transport type as the preferred A-interface transport type in case said second connection leg transport type is Time Division Multiplexing.

10. The apparatus according to claim 1,wherein said processor is configured to determine said first A-interface transport type as the preferred A-interface transport type in case said second connection leg codec is Pulse Code Modulation (PCM).

11. The apparatus according to claim 1, wherein said processor is configured to determine said second A-interface transport type as the preferred A-interface transport type in case said second connection leg codec is a compressed codec and said second connection leg transport type is one of Asynchronous Transfer Mode (ATM) and Internet Protocol (IP).

12. The apparatus according to claim 1, which further comprises a transmitter, and wherein said processor is configured to cause said transmitter to transmit a message to the base station subsystem, requesting a connection according to the preferred A-interface resource.

13. The apparatus according to claim 1, which further comprises a receiver configured to receive a response message indicating a respectively selected A-interface resource.

14. The apparatus according to claim 13, wherein said receiver is further configured to receive information on capabilities of a base station subsystem.

15. The apparatus according to claim 1, which further comprises a memory configured to store information on capabilities of a base station subsystem, and wherein said processor is further configured to retrieve the information from the memory.

16. The apparatus according to claim 1, wherein the preferred A-interface resource is to be used on an interface between the mobile switching center and the base station subsystem.

17. The apparatus according to claim 12, wherein said transmitter is configured to transmit the message via a control plane signalling over Internet Protocol.

18. The apparatus according to claim 17, wherein said control plane signalling is Base Station System Application Part signalling.

19. The apparatus according to claim 17, wherein the message comprises at least one of an assignment request message and a handover request message.

20. The apparatus according to claim 13, wherein said receiver is configured to receive the information via a control plane signalling over Internet protocol.

21. A communication apparatus, comprising:
- input and output means;
- processing means of a mobile switching center for determining a preferred A-interface resource based on information on capabilities of base station subsystem and on characteristics of second connection leg of a connection.

22. The apparatus according to claim 21, which further comprises transmitting means, said processing means causing said transmitting means to transmit a message to the base station subsystem, which requests a connection according to the preferred A-interface resource.

23. The apparatus according to claim 21, wherein said apparatus is a mobile switching center server.

24. A method, comprising:
- determining, by a mobile switching center, a preferred A-interface resource on a first connection leg based on information on capabilities of a base station subsystem and on characteristics of a second connection leg of a connection.

25. The method according to claim 24, wherein the preferred A-interface resource comprises one of a first A-interface transport type and a second A-interface transport type.

26. The method according to claim 24, wherein the preferred A-interface resource is a speech codec.

27. The method according to claim 24, wherein the capabilities of a base station subsystem comprise support for a first A-interface transport type and support for a second A-interface transport type.

28. The method according to claim 27, wherein the first A-interface transport type is an A-interface over Time Division Multiplexing and the second A-interface transport type is an A-interface over Internet protocol.

29. The method according to claim 28, wherein the A-interface over Internet protocol is an A-interface over Internet protocol with transcoding in Media gateway.

30. The method according to claim 24, wherein the characteristics comprise second connection leg transport type.

31. The method according to claim 24, wherein the characteristics comprise second connection leg codec.

32. The method according to claim 24, further comprising determining the first A-interface transport type as the preferred A-interface transport type in case the second connection leg transport type is Time Division Multiplexing.

33. The method according to claim 24, which further comprises determining the first A-interface transport type as the preferred A-interface transport type in case the second connection leg codec is Pulse Code Modulation.

34. The method according to claim 24, which further comprises determining the second A-interface transport type as the preferred A-interface transport type in case the second connection leg codec is a compressed codec and the second connection leg transport type is one of Asynchronous Transfer Mode and Internet Protocol.

35. The method according to claim 24, which further comprises transmitting a message to the base station subsystem, which requests a connection according to the preferred A-interface resource.

36. The method according to claim 24, which further comprises receiving a response message indicating the selected A-interface resource.

37. The method according to claim 24, which further comprises receiving information on capabilities of a base station subsystem.

38. The method according to claim 24, which further comprises storing information on capabilities of a base station subsystem, and retrieving the information from the memory.

39. The method according to claim 24, wherein the preferred A-interface resource is to be used on an interface between a mobile switching center server system and the base station subsystem.

40. The method according to claim 35, which further comprises transmitting the message via a control plane signalling over Internet Protocol.

41. The method according to claim 40, wherein the control plane signalling is Base Station System Application Part signalling.

42. The method according to claim 35, wherein the message comprises at least one of an assignment request message and a handover request message.

43. The method according to claim 36, which further comprises receiving the information via a control plane signalling over Internet protocol.

44. A non-transitory computer readable medium, comprising a program for a processor, said program having software code portions stored in non-transitory form and configured, when the program is run on the processor, to determine, by a mobile switching center, a preferred A-interface resource on a first connection leg based on information on capabilities of a base station subsystem and on characteristics of a second connection leg of a connection.

45. The non-transitory computer readable medium according to claim 44, further comprising a computer-readable medium on which said software code portions are stored in non-transitory form.

46. The non-transitory computer readable medium according to claim 44, wherein said program is directly loadable into an internal memory of the processor.

* * * * *